United States Patent Office 3,472,024
Patented Oct. 14, 1969

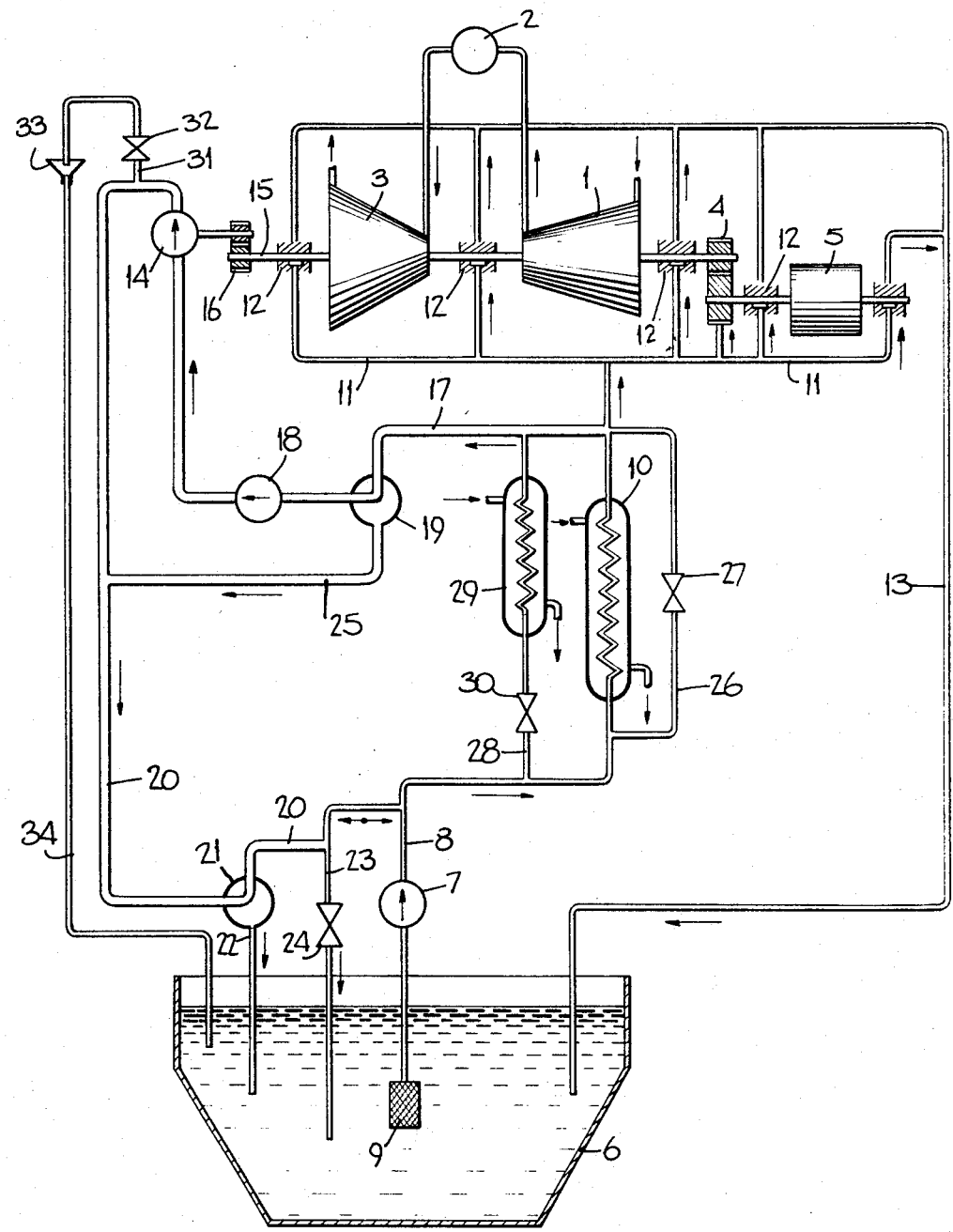

3,472,024
STARTING SYSTEM FOR A GAS TURBINE PLANT
Rene Strub and Emil Graf, Winterthur, Switzerland, assignors to Sulzer Brothers, Ltd., Winterthur, Switzerland, a corporation of Switzerland
Filed Oct. 27, 1967, Ser. No. 678,645
Int. Cl. F02g *3/00;* F02c *7/26;* F01m *1/00*
U.S. Cl. 60—39.08                                        4 Claims

ABSTRACT OF THE DISCLOSURE

The gas turbine plant is started by means of a hydraulic turbine. A flow of oil from the delivery pressure zone of the lubricating oil system of the plant is pumped to the hydraulic turbine to raise the pressure in the turbine system by the amount of the pressure in the lubricating oil system. Thereafter, the oil is directed back to the lubricating oil system.

---

This invention relates to a starting system for a gas turbine plant. More particularly, this invention relates to an apparatus and method for starting a gas turbine plant.

Heretofore, gas turbine plants have been started with the aid of electric motors or, in some instances, oil-pressure piston engines. Further, in the case of a gas turbine plant used at gas-pipeline stations, proposals have been made to use natural gas expansion turbines.

It is an object of this invention to utilize a hydraulic turbine to start up a gas turbine.

It is another object of the invention to utilize a hydraulic turbine with an outlet pressure in excess of 1 atmosphere in order to avoid cavitation phenomena.

Briefly, the invention provides a gas turbine plant having a lubricating oil system with a starting turbine which is connected to the lubricating oil system by means of a starting turbine system. The starting turbine is connected to the gas turbine plant while the starting turbine system couples the inlet and outlet of the starting turbine to a delivery pressure zone of the lubricating oil system at spaced points in order to circulate oil from the lubricating oil system through the starting turbine so as to raise the pressure level of the starting system by the amount of the lubricating oil system. The starting turbine system also includes a starting pump to increase the level of pressure in the starting system.

In one embodiment of the invention, the starting turbine system on the pressure side of the starting turbine is connected to the output of a cooler disposed in the lubricating oil system while the starting system on the other side of the starting turbine is connected to the input of the cooler. This allows the cooler of the lubricating oil system to carry away the loss of heat from the starting system. The use of the cooler is possible in this embodiment since the lost heat from the lubricating oil system of the gas turbine plant is smaller during the starting process as compared to normal running operation.

The method of the invention resides in pumping oil from the delivery pressure zone of the lubricating oil system of the gas turbine plant through the starting turbine and back to the lubricating oil system after expansion so that the pressure level of the starting system is raised by the amount of the lubricating oil system. In this way, the outlet pressure of the starting turbine is easily and economically placed above atmospheric pressure.

These and other objects and advantages of the invention will become more apparent from the following detailed description and appended claims taken in conjunction with the accompanying drawing in which:

The drawing illustrates a schematic view of a gas turbine plant utilizing a hydraulic starting turbine according to the invention.

Referring to the drawing, the plant includes a compressor 1, a combustion chamber 2 and a gas turbine 3 connected together in known manner to a transmission 4 for driving a generator 5. A lubricating oil supply system of the plant includes an oil tank 6, a pump 7, an oil line 8 to one end of which a filter 9 is connected and a cooler 10. Oil from the tank 6 is delivered through a system of pipes 11 into the bearings 12 and transmission 4 of the gas turbine plant and thence returned back to the oil tank 6.

The starting system of the plant includes a starting turbine 14 such as a Francis turbine which is rigidly connected to the shaft of the gas turbine plant through a gear 16. In addition, a pipe 17 is connected to the lubricating oil supply system at the outlet of the cooler 10 and a starting pump 18 and two-way valve 19 are interposed in the pipe 17. The outlet side of the turbine 14 is connected to the lubricating oil supply system dowstream of the supply side of the pump 7 by means of a pipe 20 in which a two-way valve 21 is disposed. A pipe 22 is connected to the two-way valve 21 to discharge into the oil tank 10. Further, the pipe 20 is connected to a pipe 23 which extends into the oil tank 6 and which has a spring loaded safety valve 24 therein to safeguard the pump 7, the pipe 20 being connected upstream of the valve 24.

A by-pass pipe 25 is connected to the two-way valve 19 in the pipe 17 and to the pipe 20 downstream of the starting turbine for a purpose hereinafter described. Likewise, a by-pass pipe 26 containing a spring loaded valve 27 is connected in the oil supply system in parallel relation to the cooler 10.

In operation, the pump 7 draws oil from the tank 6 and brings the oil to the pressure required in the lubricating oil system. With the two-way valves 19, 21 connecting the starting system into the lubricating oil supply system, oil is drawn out of the oil supply system downstream of the cooler 10 by the starting pump 18 and brought to the desired pressure thereby. During this time, the by-pass pipe 25 is out of communication with the starting system. The oil is then expanded in the starting turbine 14 to the delivery pressure of the lubricating oil pump 7, increased by the pipe losses, and flows back into the pipe 8 through the valve 21.

Advantageously, the cooler 10 through which the water flows is dimensioned, for example, for the quantity of oil required for the lubricating oil system of the gas turbine plant, i.e., bearings, transmission lubrication and cooling. As a far greater quantity of oil circulates in the starting system than that fed to the lubricating oil supply system, a relatively high pressure drop arises in the cooler 10 during starting as compared wtih the normal running of the plant. Thus, the spring loaded valve 27 in the by-pass pipe 26 is operated as a function of the high pressure drop to open so as to allow a part of the oil quantity to flow through the by-pass pipe 26. For example, with an oil pressure of the lubricating oil system at approximately 2 atmospheres and an inlet pressure of the starting turbine 14 at approximately 30 atmospheres, the lubricating oil supply system receives 20 liters of oil per second and the starting system receives approximately 100 liters of oil per second. During starting, 40 liters of oil per second pass through the cooler 10 while the remaining 80 liters of oil per second flows through the by-pass pipe 26.

In order to achieve an additional cooling of the oil, a by-pass pipe 28 incorporating a cooler 29 and a spring loaded valve 30 is disposed in parallel relation to the cooler 10 in the oil supply system. As above, the cooler 29 operates automatically through the aid of the valve 30.

Upon completion of the starting operation, the starting pump 18 is stopped and the two-way valves 19, 21 are actuated to separate the starting system out of the lubricating oil system. The oil in the starting system is then discharged through pipes 25, 20 and 22 into the oil tank 6.

A de-aerating apparatus can be connected to the starting system which consists, for example, of a vent nozzle 31 having a valve 32 which is opened during the time in which the starting system is filled or emptied and a pipe 34 which has a funnel 33 at the upper end and which discharges into the oil tank 6 at the lower end.

As the starting turbine 14 is coupled rigidly to the shaft 15 of the gas turbine plant, the turbine 14 rotates in air when the starting system is emptied. The losses which then result are extremely low and can easily be dissipated.

Alternatively, the starting turbine can be connected to the gas turbine plant through a separable coupling (not shown). In such a case, the two-way valves 19, 21 and the pipes 22, 25 become unnecessary. Further, a non-return valve is incorporated in the pipe 20 in place of the two-way valve 21 to open when the pump 18 and starting turbine 14 are running and to close when the pump 18 is stopped and the turbine 14 disengaged.

What is claimed is:

1. In combination with a gas turbine plant having a lubricating oil supply system including a delivery pressure zone therein; a starting system comprising a starting turbine for said plant having an inlet and an outlet, first means connecting said inlet to said delivery pressure zone of said lubricating oil supply system and second means connecting said outlet to said delivery pressure zone, and at least one pump operatively disposed in said first means for raising the pressure level of the oil therein.

2. The combination as set forth in claim 1 wherein said plant includes an oil tank upstream of said pressure delivery zone, and said starting system further includes a first two-way valve in said first means upstream of said pump, a by-pass pipe selectively connected to said first two-way valve at one end and to said second means at the other end, a second two-way valve in said second means downstream of said by-pass pipe, and a discharge pipe selectively connected to said second two-way valve at one end and disposed in said oil tank at the other end.

3. The combination as set forth in claim 1 wherein said plant includes a cooler in said delivery pressure zone of said lubricating oil supply system for cooling the oil circulating therethrough and said first means is connected to the outlet of said cooler and said second means is connected to the inlet of said cooler and wherein said lubricating oil supply system further includes a by-pass pipe means in parallel relation with said cooler, said by-pass means including an adjustable valve therein for controlling flow of oil therethrough, and an auxiliary cooler in parallel relation with said cooler, and an adjustable valve means connected with said auxiliary cooler for controlling the flow of oil through said auxiliary cooler.

4. A method of starting a gas turbine plant having a lubricating oil system with a hydraulic turbine comprising the steps of:
pumping a flow of oil from a delivery pressure zone of the lubricating oil system to the hydraulic turbine to raise the pressure in the turbine by the amount of lubricating oil pressure in the lubricating oil system, expanding the pumped oil in the hydraulic turbine, and directing the expanded oil from the hydraulic turbine back to the delivery pressure zone of the lubricating system while maintaining the pressure in the hydraulic turbine above atmospheric pressure.

References Cited

UNITED STATES PATENTS

| | | | |
|---|---|---|---|
| 2,402,467 | 6/1946 | Thompson | 60—39.08 X |
| 2,611,440 | 9/1952 | Hayworth et al. | |
| 2,711,071 | 6/1955 | Frankel | 60—39.14 |
| 3,048,005 | 8/1962 | Egli et al. | 60—39.14 X |

CARLTON R. CROYLE, Primary Examiner

A. D. HERRMANN, Assistant Examiner

U.S. Cl. X.R.

60—39.14; 184—6